(12) United States Patent
Croxford et al.

(10) Patent No.: US 11,222,394 B2
(45) Date of Patent: Jan. 11, 2022

(54) DEVICES AND HEADSETS (71) Applicant: Arm Limited, Cambridge (GB)

(72) Inventors: Daren Croxford, Cambridge (GB); Mbou Eyole, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/824,040

(22) Filed: Mar. 19, 2020

(65) Prior Publication Data

US 2021/0295464 A1 Sep. 23, 2021

(51) Int. Cl.
*G06T 1/20* (2006.01)
*G06F 3/01* (2006.01)

(52) U.S. Cl.
CPC ............... *G06T 1/20* (2013.01); *G06F 3/013* (2013.01)

(58) Field of Classification Search
CPC .................................. G06T 1/20; G06F 3/013
See application file for complete search history.

(56) References Cited

U.S. PATENT DOCUMENTS

| | | | |
|---|---|---|---|
| 10,496,165 B2 | 12/2019 | Bogusz et al. | |
| 2017/0068312 A1* | 3/2017 | Mallinson | H04N 21/234345 |
| 2019/0287495 A1* | 9/2019 | Mathur | G06T 15/00 |
| 2019/0339770 A1* | 11/2019 | Kurlethimar | G06F 3/016 |

\* cited by examiner

*Primary Examiner* — Chong Wu
(74) *Attorney, Agent, or Firm* — EIP US LLP (57) ABSTRACT

A device has a content processing component operable in first and second content processing states, a display, at least one sensor operable to output sensor data indicative of at least one eye positional characteristic of a user, and a processor. The processor is configured to process the data, and in the first processing state, determine a region of the display corresponding to a foveal region of an eye of a user, and perform foveated processing of content to be displayed on the display such that a relatively high-quality video content is generated for display in the region and a relatively low-quality video content is generated for display outside the region. The second processing state is entered in response to a trigger. In the second processing state, the foveated processing used is overridden such that relatively low-quality video content is generated for display in at least a portion of the region.

16 Claims, 9 Drawing Sheets

DEVICES AND HEADSETS

BACKGROUND OF THE INVENTION

Field of the Invention

The present invention relates to devices and headsets.

Description of the Related Technology

Devices are becoming more complex to meet growing user expectations. In particular, content processing components of such devices, such as graphics processing units, are becoming more complicated. Although increased complexity of such components can enhance user experience by providing increased content processing capabilities, it can also increase power consumption levels of such components and devices. There is also an ever-increasing demand for devices to be as small and light as possible. Increased power consumption levels in a smaller device can lead to thermal management issues, and increased power consumption levels may lead to quicker run down of battery levels in a battery powered device.

SUMMARY

According to a first aspect of the present disclosure, there is provided a device comprising: a content processing component operable in first and second content processing states; a display for displaying an image based on an output of the content processing component; at least one sensor operable to output sensor data indicative of at least one eye positional characteristic of a user of the device, the at least one eye positional characteristic being indicative of a region of the display determined to correspond to a foveal region of an eye of the user; and a processor configured to: process the sensor data; in the first content processing state of the content processing component: determine, on the basis of the processed sensor data, a region of the display corresponding to the foveal region, perform foveated processing of content to be displayed on the display, such that a relatively high-quality video content is generated for display in the determined region and relatively low-quality video content is generated for display outside the determined region; and identify, on the basis of the processed sensor data, a trigger for entering the second content processing state of the content processing component; and in the second content processing state of the content processing component, over-ride the foveated processing used in the first content processing state such that relatively low-quality video content is generated for display in at least a portion of the determined region.

According to a second aspect of the present disclosure there is provided a method of operating a device according to the first aspect of the present disclosure, the method comprising processing the sensor data, and based on the processed sensor data operating the content processing component in one of the first and second content processing states.

According to a third aspect of the present disclosure there is provided a data carrier comprising machine readable instructions for the operation of one or more processors of a device according to the first aspect of the present disclosure to process the sensor data; and based on the processed sensor data, operate the content processing component in one of the first and second content processing states.

According to a fourth aspect of the present disclosure there is provided a device comprising: a content processing component operable in a plurality of content processing states; a display for displaying an image based on an output of the content processing component; a sensor operable to output sensor data indicative of a speed of motion of an eye of a user of the device relative to the display; and a processor configured to: process the sensor data; compare the processed sensor data to a threshold; and where the processed sensor data differs from the threshold, alter a content processing state of the content processing component.

According to a fifth aspect of the present disclosure there is provided a device comprising: a display for displaying an; a sensor operable to output sensor data indicative of a direction of a foveal region of an eye of a user of the device relative to the display; and a processor configured to: process the sensor data; utilise the processed sensor data to determine whether an object shown on the display is a subject of focus of the user; and where the object is determined to be a subject of focus of the user, displaying the object on the display using a first quality video content whilst displaying the remainder of the display at a second quality video content lower than the first quality video content.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, devices have a content processing component which is operable in a first content processing state to determine, on the basis of processed sensor data indicative of at least one eye positional characteristic of a user of the device, a region of a display of the device corresponding to the foveal region, and perform foveated processing of content to be displayed on the display, such that a relatively high-quality video content is generated for display in the determined region and relatively low-quality video content is generated for display outside the determined region. A foveal region of a human eye has high visual acuity and supports good colour vision, but is not sensitive to dim light. In contrast, the peripheral region has much lower visual acuity, is sensitive to dim light, and is not colour sensitive. Foveated processing of content to be displayed on the display, such that a relatively high-quality video content is generated for display in a region of the display determined to correspond to the foveal region of the eye of the user, and relatively low-quality video content is generated for display outside the determined region, may reduce a graphics computing requirement on the content processing component, for example a rasterization or ray-tracing computing requirement, by varying the visual quality across the display. This may reduce power consumption of components of the device, and, for example, may provide the device with lower thermal management requirements and/or increased usage time per charge of a battery operated device.

In examples herein, the content processing component of a device is operable in a second content processing state, in response to a trigger, to over-ride the foveated processing used in the first content processing state such that relatively low-quality video content is generated for display in at least a portion of the region of the display of the device corresponding to the foveal region of the eye of the user. Thus the quality of video content generated for display in at least a portion of the determined region may be reduced in response to the trigger. This may reduce a graphics computing requirement on the content processing component by varying the visual quality across the display where it is determined that high-quality video content is not required in at least a portion of the determined region.

In examples herein, the sensor data may be processed to determine a speed of motion of an eye of the user, and the trigger may comprise a determination that the speed of motion is above a pre-determined threshold. Where an object is sufficiently large that not all of the object falls within the foveal region of an eye of a user, the user must constantly shift the position of the eye to bring different portions of the object into the foveal region of the eye. The movements of the eye in this manner are known as saccades or saccadic eye movements. Typically several saccades are made each second, and no useful visual information can be taken in whilst saccadic motion occurs. By entering the second content processing state in response to speed of motion of an eye being above a pre-determined threshold, for example in response to saccadic motion of the eye being detected, relatively low-quality video content may be generated for display in at least a portion of the region of the display of the device corresponding to the foveal region of the eye of the user when it is determined that no useful visual information can be taken in by a user. This may reduce a graphics computing requirement on the content processing component by varying the visual quality across the display where it is determined that high-quality video content is not required in at least a portion of the determined region. In examples herein, the sensor data is processed to determine saccadic motion of an eye of the user, and where saccadic motion is determined, the content processing component operates in the second content processing state.

In examples herein, the trigger may comprise a determination of simultaneous movement of two eyes of a user in opposing directions. To maintain binocular vision when focusing on different objects, the eyes of a human being simultaneously move in opposing directions. Such a movement is referred to as vergence. In some examples, the second content processing state is entered when vergence is detected, which may reduce a graphics computing requirement on the content processing component by varying the visual quality across the display. In some examples, the sensor data is indicative of at least one eye positional characteristic of two eyes of a user of the device.

In examples herein, the sensor data may be processed to determine if an object displayed on the display is a subject of focus of the user, and the trigger comprises a determination that the object is a subject of focus. In human vision, the eyes typically scan around the outline of an object. If a user is looking at an edge of an object, then it is often the case that background objects which are not in focus are within the foveal regions of the eyes of the user. In such circumstances, the background objects may not need to be displayed with a high-quality video content as they are not the subject of focus. Thus the second content processing state may be entered when an object is determined to be a subject of focus, and lower-quality video content may be used in the region of the display other than that corresponding to the object. This may reduce a graphics computing requirement on the content processing component by varying the visual quality across the display.

Figure 1:
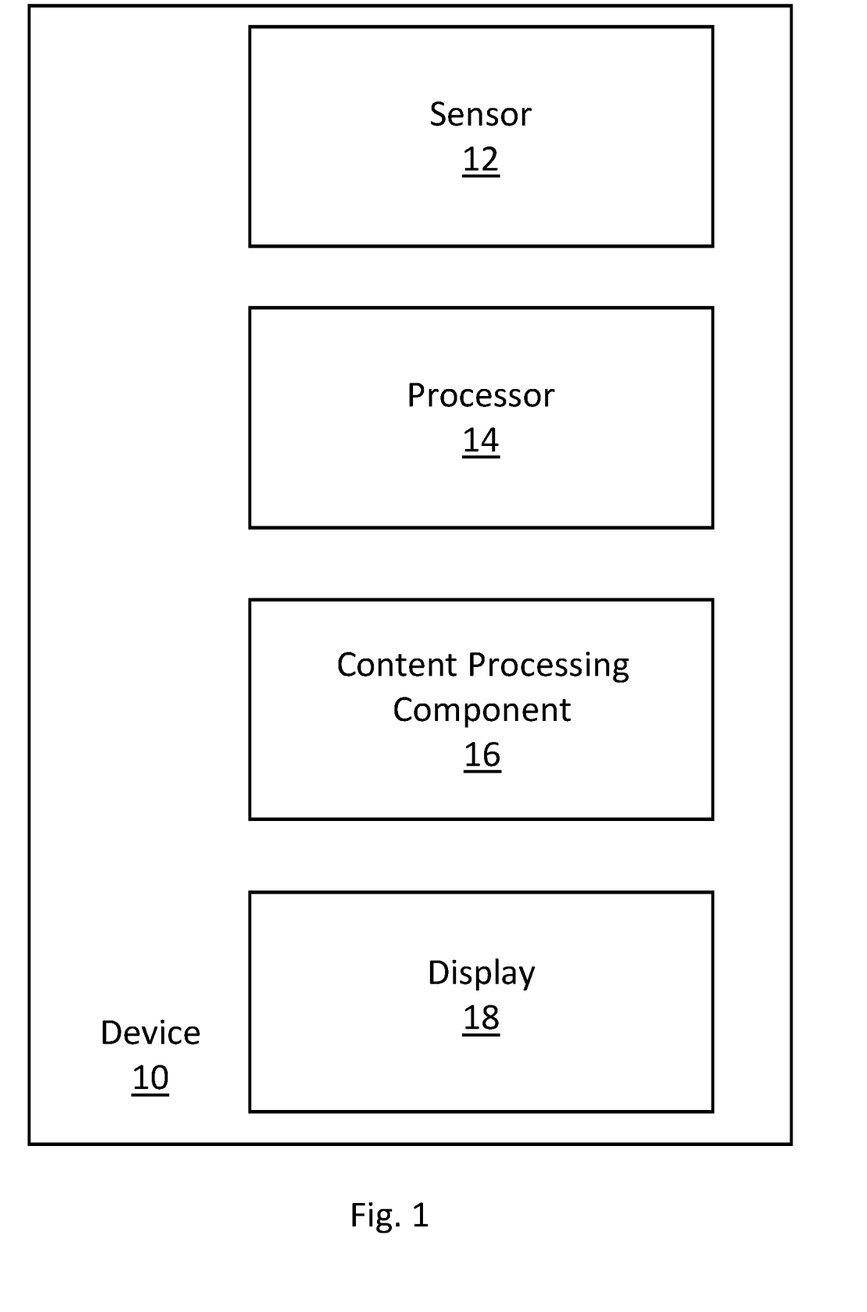
FIG. 1 is a schematic view of a device according to an example.

An example of a device 10 is shown schematically in FIG. 1.

The device 10 may be or may be comprised in a wearable device, for example in the form of a headset. A headset may comprise a head-mounted display (HMD) worn on the head of a user. A HMD typically has one or more display screens, with each display screen corresponding to one or both eyes of the user. The headset may comprise an augmented reality (AR) headset. An AR headset may comprise an opaque display, for example where an image of a surrounding environment is captured by a camera, and virtual objects are generated and combined appropriately with the captured image. An AR headset may comprise a transparent display through which a user can see their surrounding environment, with virtual objects being displayed on the display. The headset may comprise a virtual reality (VR) headset, which generates virtual reality content to be displayed on the display screen(s).

In the example schematically shown in FIG. 1, the device 10 comprises a sensor 12, a processor 14, a content processing component 16, and a display 18. The sensor 12 is communicatively coupled to the processor 14 via a first communication channel, which may use an industry-standard communication technology. The content processing component 16 is communicatively coupled to the processor 14 via a second communication channel, and is communicatively coupled to the display 18 via a third communication channel. Although shown in FIG. 1 as comprising only one of each of the sensor 12, the processor 14, the content processing component 16 and the display 18, it will be appreciated that the device 10 may comprise more than one of each of the aforementioned components. The device 10 may also comprise further components not depicted in FIG. 1, including, for example, at least one memory, at least one user interface, and at least one power source.

The sensor 12 is operable to output sensor data indicative of at least one eye positional characteristic of a user of the device 10. For example, the sensor 12 may be operable to output sensor data that is indicative of one or more of a rotational position of an eye, a direction of a foveal region of the user relative to the display 18, and a direction of a pupil of the user relative to the display 18. In some examples, the sensor 12 may comprise an eye tracking sensor. An eye tracking sensor may comprise an optical eye tracking sensor which is able to track the motion of one or more eyes of a user by detecting light reflected from the eye of the user with a video camera or other sensor. Eye tracking sensors may indicate current eye positional characteristics, and may provide accurate eye location information Alternatively, an eye tracking sensor may comprise an electrical potential eye tracking sensor which utilizes electrical potentials measured within one or more electrodes placed around the eye of a user. For example, the eye tracking sensor may utilize electroencephalography (EEG), electromyography (EMG), or electrooculography (EOG) signal detection to track motion of the eye of a user. Electrical potential eye tracking sensors may provide an indication of movement before movement actually begins, and hence may provide low latency. Use of an electrical potential eye tracking sensor may therefor enable a content processing state of the content processing component 16 to be altered sooner than would be the case with an optical eye tracking sensor alone. This may allow for finer control of content processing states of the content processing component 16.

In some example, the eye tracking sensor may comprise an optical eye tracking sensor and an electrical potential eye tracking sensor. This may provide both lower latency and high location accuracy.

The at least one eye positional characteristic may be indicative of a region of the display 18 determined to correspond to a foveal region of an eye of the user. For example, where the eye positional characteristic is the rotational position of the eye or the direction of a pupil relative to the display 18, it is possible to determine which portion of the display 18 the eye is looking at, and a sub-portion can then be allocated as corresponding to the foveal region of the eye. This is shown schematically in FIG. 2 for a single eye, and it will be appreciated that the concept can be extended for two eyes in a similar manner.

Figure 2:
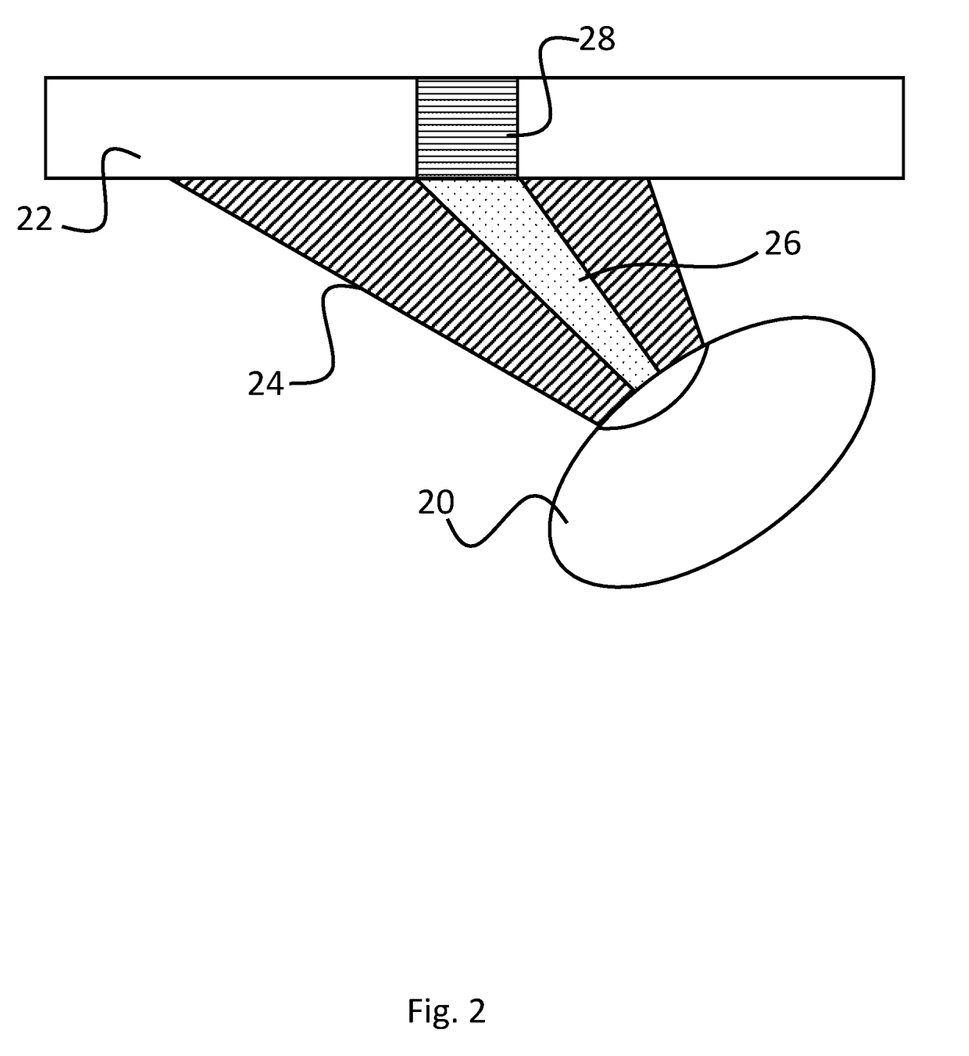
FIG. 2 is a schematic view illustrating a foveal region of a single eye relative to a display.

In FIG. 2, an eye 20 is rotated at approximately 45° relative to a display 22 and has a field of view 24, indicated by the hashed cross-sectional area. A nominal sub-set of the field of view 24 can be taken to correspond to the foveal region 26 of the eye 20, with the foveal region 26 indicated in FIG. 2 by dotted shading. Typically, the foveal region of an eye of a user is around 2° of the field of view of a user, and so the nominal sub-set can be set accordingly. It will of course be appreciated that the size of the foveal region will vary from user to user, and the device may be calibrated to account for such variation. A determined region 28 of the display 12 may then be taken to correspond to the foveal region 26 of the eye 20, with the determined region 28 indicated by horizontal stripes. It will be appreciated that the size of the foveal region 26 in FIG. 2 may have been exaggerated for clarity.

Referring back to the device 10 of FIG. 1, the processor 14 is able to process the data output by the sensor 12, and the content processing component 16 is operable in first and second content processing states. In the first content processing state, the processed sensor data may be used determine a region of the display 18 corresponding to the foveal region of an eye of a user of the device 10. Where the content processing component 16 operates in the first content processing state, foveated processing of content to be displayed on the display 18 may be performed. In particular, content may be processed such that such that a relatively high-quality video content is generated for display in the determined region and relatively low-quality video content is generated for display outside the determined region. Thus relatively high-quality video content may be generated for display where it is needed, for example at a region of the display 18 corresponding to a foveal region of an eye of a user, whilst relatively low-quality video content may be generated for display elsewhere on the display 18. This may reduce a graphics computing requirement on the content processing component 16.

Based on the processed sensor data, the processor 14 is configured to identify a trigger for entering the second content processing state of the content processing component 16. In the second content processing state of the content processing component 16, the foveated processing used in the first content processing state is overridden such that relatively low-quality video content is generated for display in at least a portion of the determined region. In this manner, relatively low-quality video content can be generated for display in at least a portion of a region of the display 18 determined to correspond to the foveal region of an eye of a user where it is determined that relatively high-quality video content is not needed. In some examples, operation may revert to the first content processing state from the second content processing state in response to a further trigger.

In some examples of the device 10, relatively low-quality video content is generated for display outside the determined region when operating in the second content processing state. This may reduce a graphics computing requirement on the content processing component, for example compared to a display utilizing solely high-quality video content.

In some examples of the device 10, relatively low-quality video is generated for display on substantially the entirety of the display 18 when operating in the second content processing state. This may reduce a graphics computing requirement on the content processing component 16.

In some examples of the device 10, no content is generated for display on the display 18 when operating in the second content processing state. This may reduce a graphics computing requirement on the content processing component 16.

In some examples of the device 10, relatively high-quality video content is generated for display in a further portion of the determined region. This may enable relatively high-quality video content to be generated for display where needed in the determined region whilst reducing a graphics computing requirement on the content processing component 16 by generating low-quality video content for display where not needed in the determined region.

Figure 3:
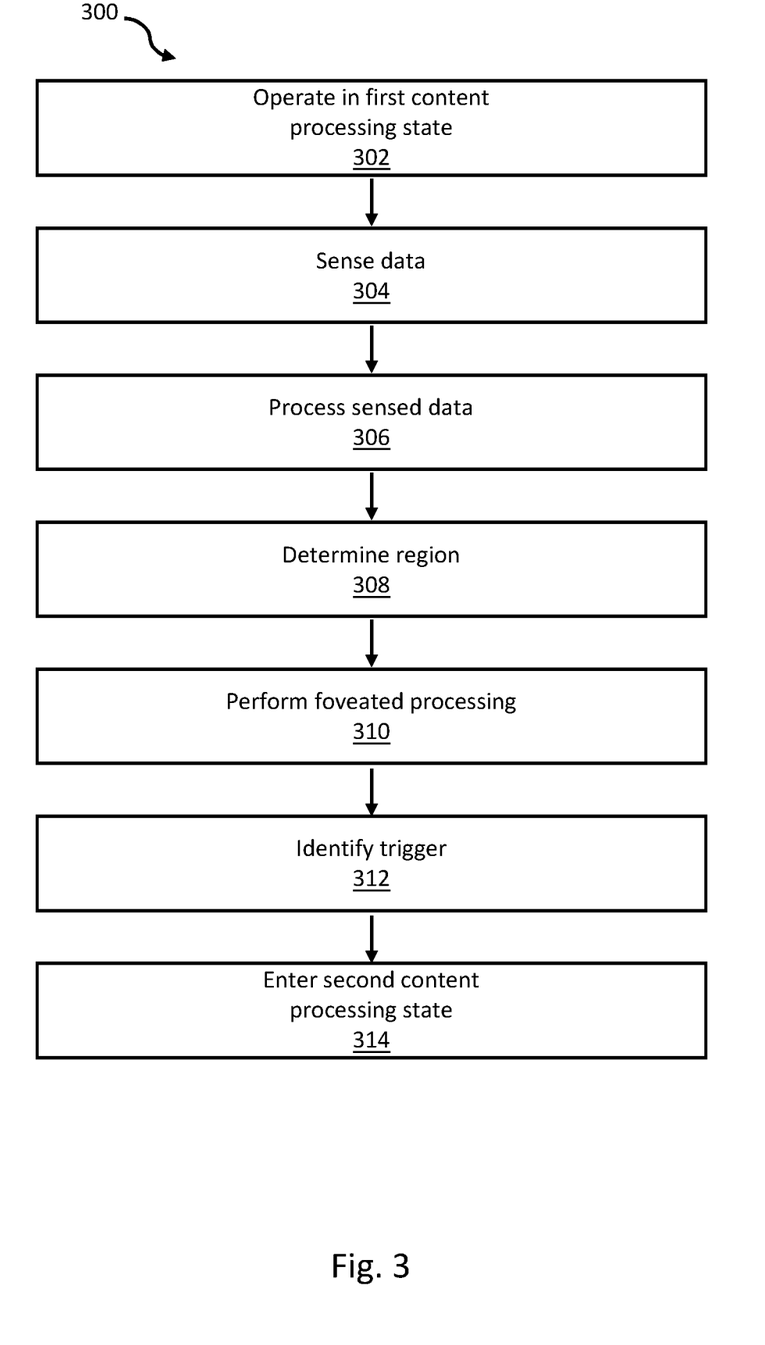
FIG. 3 is a schematic view illustrating a first method of operating a device according to an example.

Examples of the steps taken in controlling the device 10 are shown schematically by a method 300 in FIG. 3.

The method 300 comprises operating 302 the content processing component 16 in a first content processing state, sensing 304 data indicative of at least one eye positional characteristic of a user of the device 10 using the sensor 12, and outputting sensed data to the processor 14. Sensed data is processed 306 and a region of the display 18 corresponding to a foveal region of an eye of the user is determined 308. The method 300 comprises performing foveated processing 310 of content to be displayed on the display 18, such that a relatively high-quality video content is generated for display in the determined region and relatively low-quality video content is generated for display outside the determined region. A trigger is identified 312, and the content processing component 16 enters 314 a second content processing state. In the second operating state, the foveated processing used in the first content processing state is overridden such that relatively low-quality video content is generated for display in at least a portion of the determined region In an example of the device 10, the trigger for entering the second processing state may be a speed threshold for speed of motion of an eye of a user. The sensor 12 is operable to output sensor data indicative of at least one eye positional characteristic of a user of the device 10, and the processor 14 is configured to process the sensor data. The sensor 12 may detect positional and time-based data relating to the eye of the user, and the processor 14 may be configured to process the positional and time-based data to determine a speed of motion of the eye. Where the detected speed of motion of the eye differs from a pre-determined threshold, for example is greater than the pre-determined threshold, the content processing component 16 operates in the second content processing state.

Figure 4:
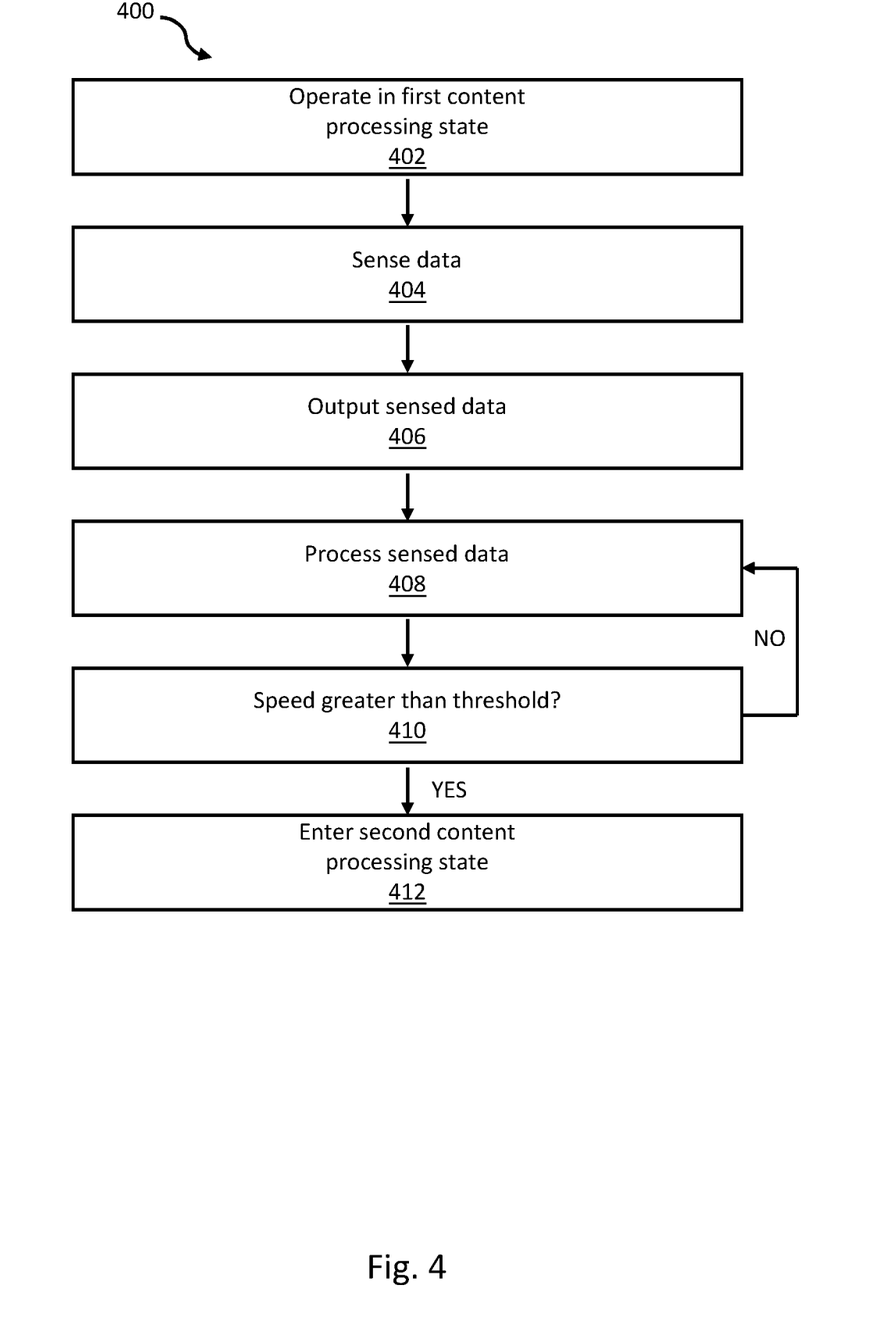
FIG. 4 is a schematic view illustrating a second method of operating a device according to an example.

The operation of this example of the device 10 can be seen schematically from the method 400 of FIG. 4.

The method 400 comprises operating 402 the content processing component 16 in a first content processing state, sensing 404 data indicative of at least one eye positional characteristic of a user of the device 10 using the sensor 12, and outputting 406 sensed data to the processor 14. Sensed data is processed 408 to determine a speed of motion of an eye of the user, and the detected speed of motion is compared 410 to a pre-determined threshold. Where the speed of motion is greater than the pre-determined threshold, the second content processing state is entered 412.

This example of the device 10 may generate relatively low-quality video content to be displayed in at least a portion of the region of the display 18 determined to correspond to the foveal region of the user when the speed of motion of an eye is determined to be above a pre-determined threshold. This may reduce a graphics computing requirement on the content processing component 16, for example where it is determined that the speed of motion of the eye is great enough that no useful visual information can be taken in.

In the second content processing state, for example where a speed of motion of an eye of a user is above a pre-determined threshold, relatively low-quality video content may be generated for display on substantially the entirety of the display 18. In the second content processing state, for example where a speed of motion of an eye of a user is above a pre-determined threshold, no content may be generated for display on the display 18. Thus the display 18 may be updated at a lower rate, or even not updated, where a speed of motion of an eye of a user is above a pre-determined threshold, thereby reducing a graphics computing requirement on the content processing component 16.

The pre-determined threshold may depend on the application, but may, for example, be around 150 degree/s.

An example of a scenario where the speed of motion of an eye is sufficiently large such that no visual information can be taken in is during saccadic motion of an eye of a user. In some examples of the device 10, the processor 14 processes data output by the sensor 12 to determine saccadic motion of an eye of a user of the device 10. The detection of saccadic motion may act as the trigger to enter the second content processing state. Thus, where saccadic motion occurs, the content processing component 16 may operate such that relatively low-quality video content is generated for display in at least a portion of a region of the display 18 determined to correspond to a foveal region of an eye of the user, as it may be the case that the eye cannot take in any visual information during saccadic motion. This may reduce a graphics computing requirement on the content processing component 16 where saccadic motion is detected.

In the second content processing state, for example where saccadic motion is detected, relatively low-quality video content may be generated for display on substantially the entirety of the display 18. This may reduce a graphics computing requirement on the content processing component 16 where saccadic motion is detected. In the second content processing state, for example where saccadic motion is detected, no content may be generated for display on the display 18. This may reduce a graphics computing requirement on the content processing component 16 where saccadic motion is detected. Thus the display 18 may be updated at a lower rate, or even not updated, where saccadic motion is detected.

Figure 5:
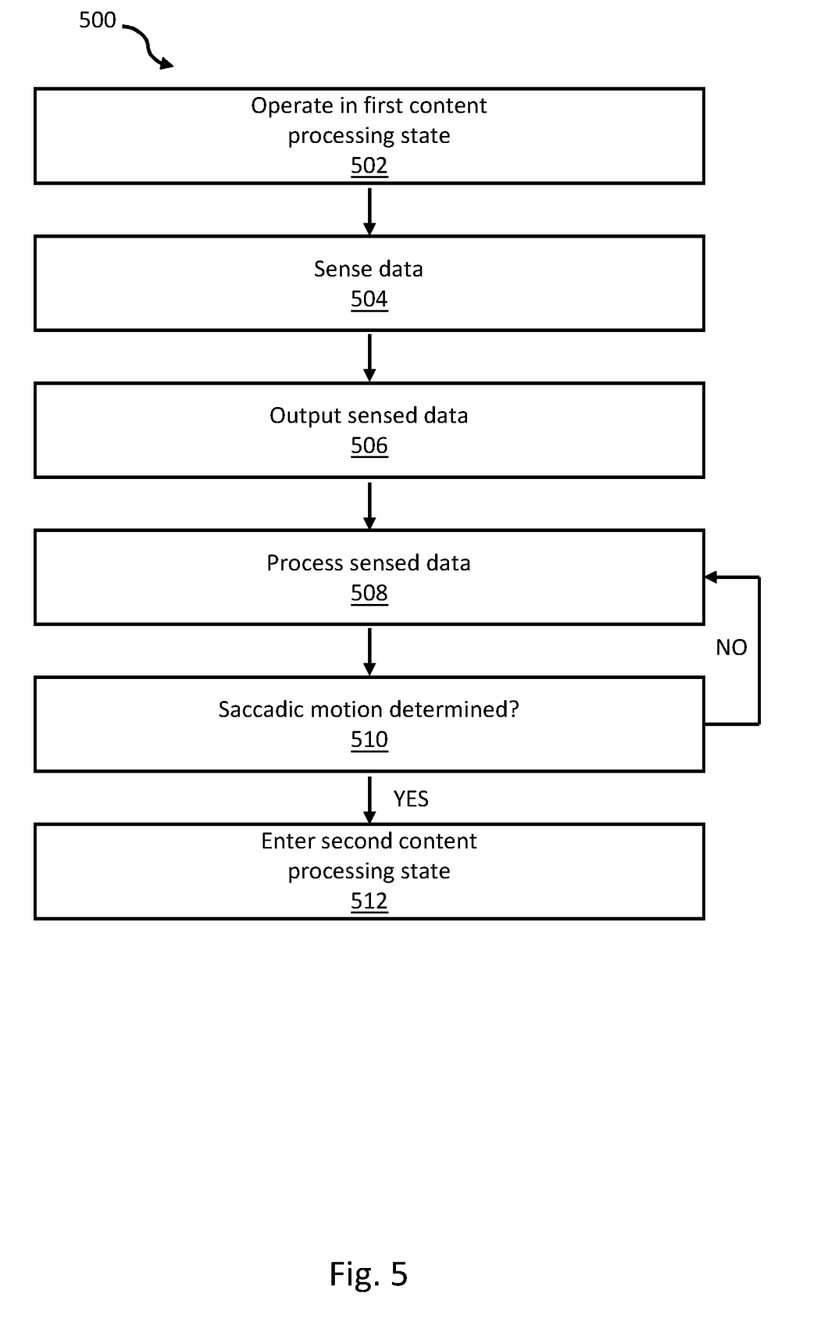
FIG. 5 is a schematic view illustrating a third method of operating a device according to an example.

The operation of an example of the device 10 where saccadic motion acts as the trigger can be seen schematically from the method 500 of FIG. 5.

The method 500 comprises operating 502 the content processing component 16 in a first content processing state, sensing 504 data indicative of at least one eye positional characteristic of a user of the device 10 using the sensor 12, and outputting 506 sensed data to the processor 14. Sensed data is processed 508 to determine 510 saccadic motion, and where saccadic motion is detected, the second content processing state is entered 512.

In another example of the device 10, the trigger for entering the second processing state may be a determination of simultaneous movement of two eyes of a user in opposing directions. The sensor 12 is operable to output sensor data indicative of at least one eye positional characteristic of a user of the device 10, and the processor 14 is configured to process the sensor data. The sensor 12 may detect positional information relating to the eyes of the user, and the processor 14 may be configured to process the positional data to determine relative motion of the eyes. Where simultaneous movement of two eyes of a user in opposing directions is detected, the content processing component 16 operates in the second content processing state.

Figure 6:
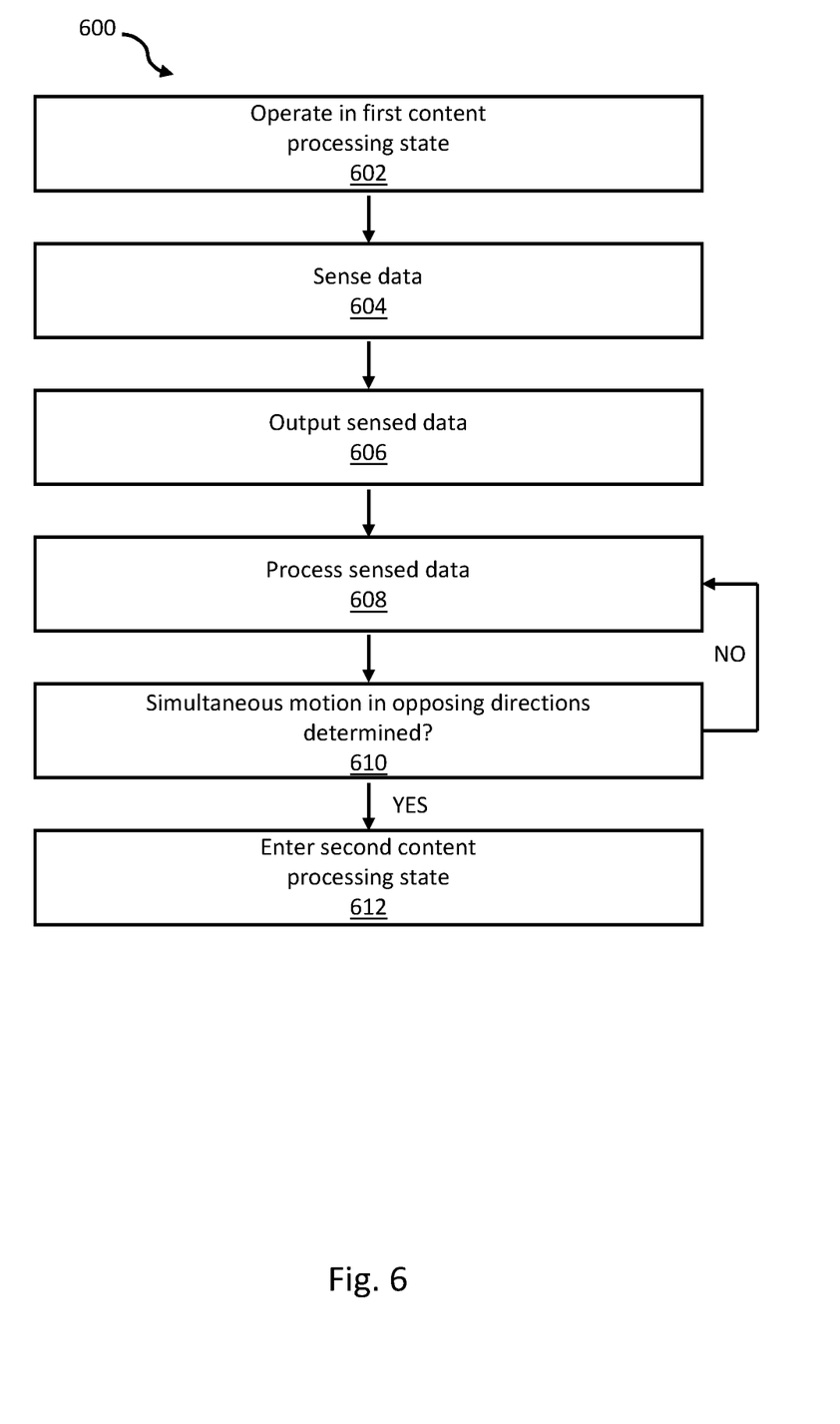
FIG. 6 is a schematic view illustrating a fourth method of operating a device according to an example.

The operation of this example of the device 10 can be seen schematically from the method 600 of FIG. 6.

The method 600 comprises operating 602 the content processing component 16 in a first content processing state, sensing 604 data indicative of at least one eye positional characteristic of a user of the device 10 using the sensor 12, and outputting 606 sensed data to the processor 14. Sensed data is processed 608 to determine motion of the eyes of the user. Where the eyes of a user are determined 610 to simultaneously move in opposing directions, the second content processing state is entered 612.

This example of the device 10 may provide a relatively low-quality video content in at least a portion of the region of the display 18 determined to correspond to the foveal region of the user when the eyes of a user are determined to simultaneously move in opposing direction. This may reduce a graphics computing requirement on the content processing component 16, for example where it is determined that the motion of the eyes is such that no useful visual information can be taken in.

In the second content processing state, for example where the eyes of a user are determined to simultaneously move in opposing directions, relatively low-quality video content may be generated for display on substantially the entirety of the display 18. In the second content processing state, for example where the eyes of a user are determined to simultaneously move in opposing directions, no content may be generated for display on the display 18. Thus the display 18 may be updated at a lower rate, or even not updated, where the eyes of a user are determined to simultaneously move in opposing directions.

An example of a scenario where the eyes of a user simultaneously move in opposing directions is during vergence movements of eyes of a user, for example to allow a user with binocular vision to focus on an object based on object depth.

In some examples of the device 10, the processor 14 processes data output by the sensor 12 to determine vergence movements of eyes of a user of the device 10. The detection of vergence movements may act as the trigger to enter the second content processing state. Thus, where vergence movements occur, the content processing component 16 may operate such that relatively low-quality video content is generated for display in at least a portion of a region of the display 18 determined to correspond to a foveal region of an eye of the user, as it may be the case that the eye cannot take in any visual information during vergence movements. This may reduce a graphics computing requirement on the content processing component 16 where vergence movements are detected.

In the second content processing state, for example where vergence movements are detected, relatively low-quality video content may be generated for display on substantially the entirety of the display 18. This may reduce a graphics computing requirement on the content processing component 16 where vergence movements are detected. In the second content processing state, for example where vergence movements are detected, no content may generated for display on the display 18. This may reduce a graphics computing requirement on the content processing component 16 where vergence movements are detected. Thus the display 18 may be updated at a lower rate, or even not updated, where vergence movements are detected.

Figure 7:
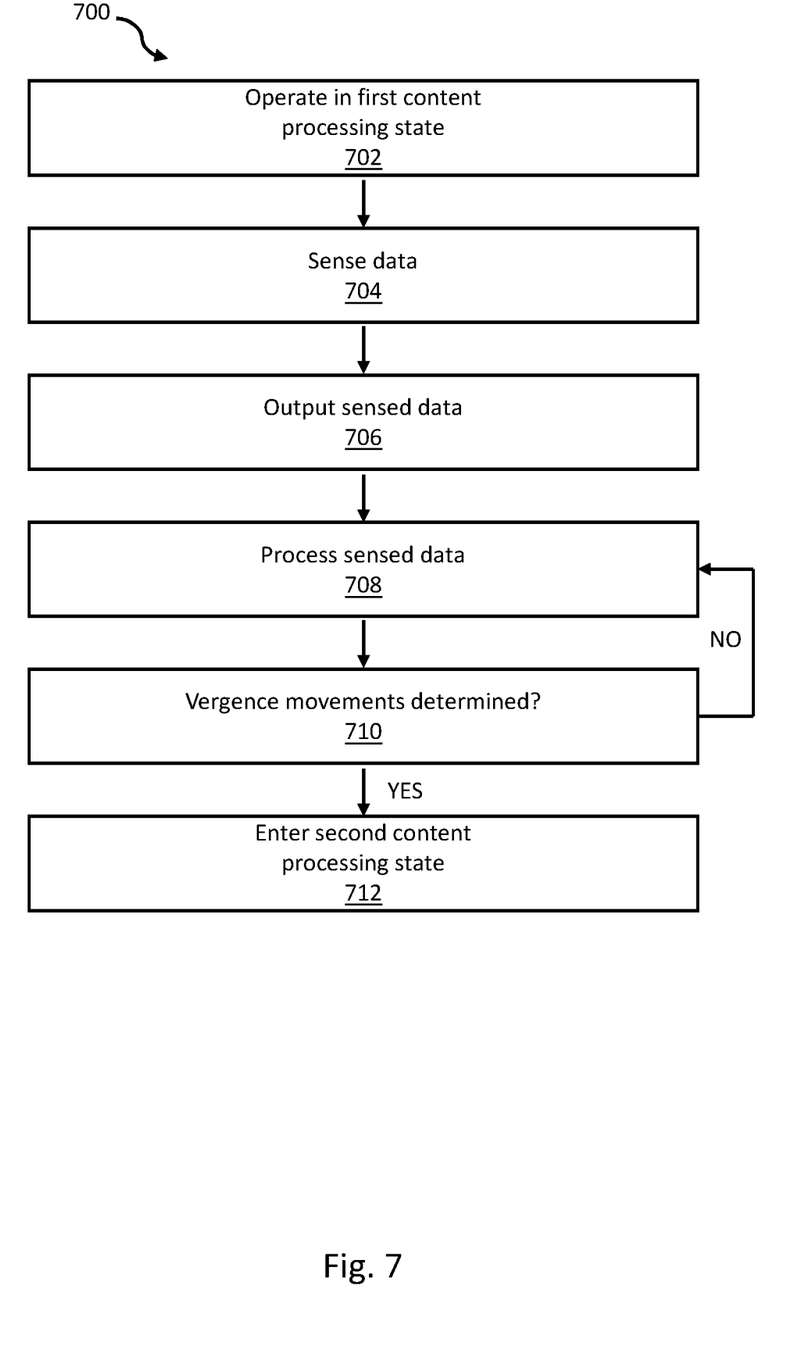
FIG. 7 is a schematic view illustrating a fifth method of operating a device according to an example.

The operation of an example of the device 10 where vergence movements act as the trigger can be seen schematically from the method 700 of FIG. 7.

The method 700 comprises operating 702 the content processing component 16 in a first content processing state, sensing 704 data indicative of at least one eye positional characteristic of two eyes of a user of the device 10 using the sensor 12, and outputting 706 sensed data to the processor 14. Sensed data is processed 708 to determine 710 if vergence movements, and where vergence movements are detected, the second content processing state is entered 712.

In an example of the device 10, the trigger for entering the second processing state may be a determination that an object displayed on the display 18 is a not a subject of focus of the user. The sensor 12 is operable to output sensor data indicative of at least one eye positional characteristic of a user of the device 10, and the processor 14 is configured to process the sensor data. The sensor 12 may detect positional information relating to the eyes of the user, and the processor 14 may be configured to process the positional information to determine whether or not an object displayed on the display 18 is the subject of focus of a user. For example, an object displayed on the display 18 will have a depth that correlates with a depth in the environment of a user of the device. The sensor 12 may determine a depth that a user is focussed on through analyzing a user's vergence movements. Where the user's focus and the depth of the object displayed on the display 18 is significantly different, it can be determined that the object is not a subject of focus of a user. Where an object is determined not to be a subject of focus of a user, the content processing component 16 operates in the second content processing state. Where an object is determined to be a subject of focus of a user, the content processing component 16 operates in the first content processing state.

Figure 8:
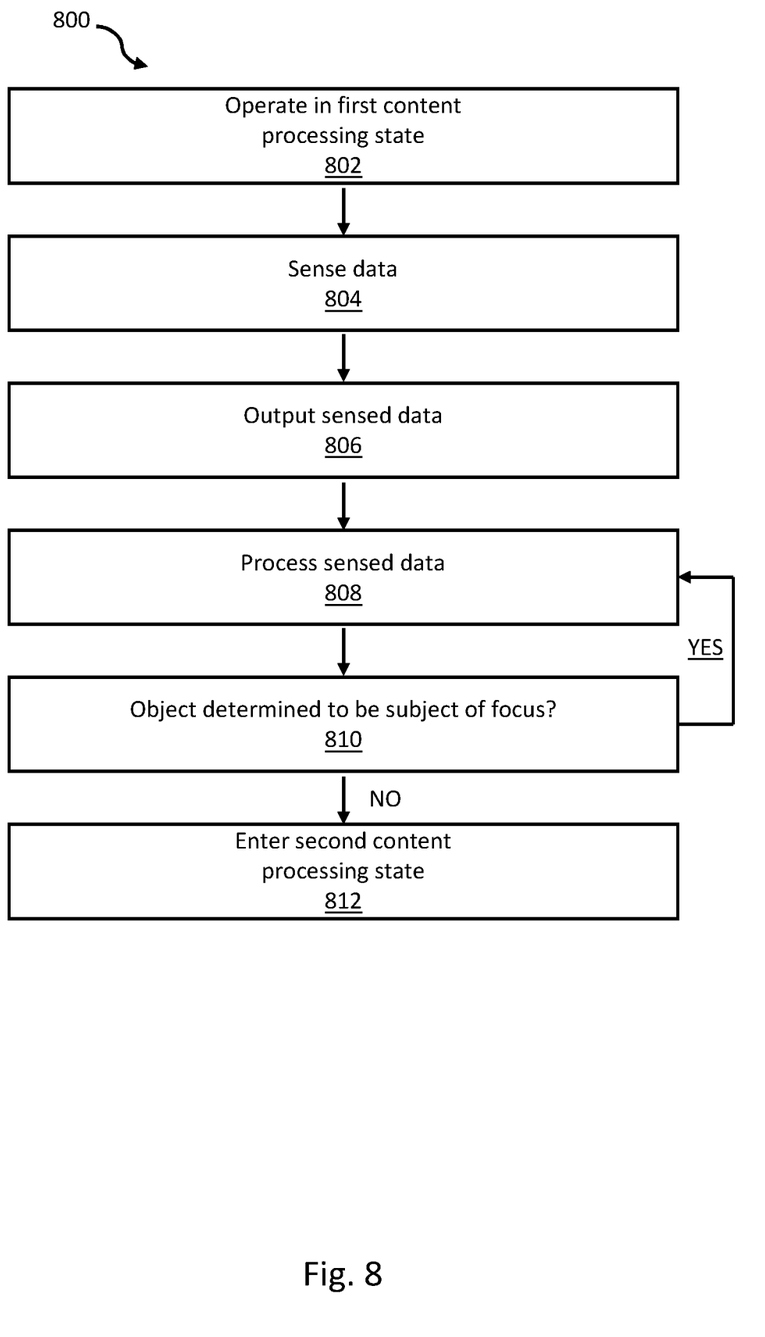
FIG. 8 is a schematic view illustrating a sixth method of operating a device according to an example.

The operation of this example of the device 10 can be seen schematically from the method 800 of FIG. 8.

The method 800 comprises operating 802 the content processing component 16 in a first content processing state, sensing 804 data indicative of at least one eye positional characteristic of a user of the device 10 using the sensor 12, and outputting 806 sensed data to the processor 14. Sensed data is processed 808 to determine whether or not an object displayed on the display is the subject of focus of a user. Where an object displayed on the display is determined 810 not to be a subject of focus of the user, the second content processing state is entered 812.

This example of the device 10 may generate a relatively low-quality video content to be displayed in at least a portion of the region of the display 18 determined to correspond to the foveal region of the user when an object displayed on the display 18 is not determined to be the subject of focus of a user. This may reduce a graphics computing requirement on the content processing component 16. For example, in human vision, the eyes often scan around the outline of an object. If a user is looking at an edge of an object, then it is often the case that background objects which are not in focus are within the foveal regions of the eyes of the user. In such circumstances, the background objects may not need to be displayed with a high-quality video content as they are not the subject of focus. Thus the second content processing state may be entered when an object is not determined to be a subject of focus, and lower-quality video content may be generated for display in the region of the display 18 other than that corresponding to the object.

In some examples, vergence movements may be used to determine whether or not an object displayed on the display 18 is a subject of focus of the user. For example, vergence movements may indicate that a user is focusing on an object displayed on the display 18, with the object being determined to be in focus once vergence movements have stopped and the eyes of a user have been at a substantially fixed location for a pre-determined time period.

In some examples, the device 10 may comprise a timer, processing the sensor data may comprise determining a time indicative of how long an eye of the user has been at a fixed location, the determined time may be compared to a pre-determined threshold, where the determined time is above a pre-determined threshold the relatively high-quality video content may be generated for display in a region in which the object determined to be a subject of focus is displayed, and where the determined time is below the pre-determined threshold relatively low-quality video content may be generated for display on substantially the entirety of the display. This may allow for the case, for example, where vergence movements of the eyes of a user have taken place, but where accommodation of the eyes of a user is still taking place. Thus relatively low-quality video content may be generated for display on the display 18 where accommodation is taking place. The content processing component 16 may switch to generating relatively high-quality video content for displaying an object in where the allocated time exceeds the pre-determined threshold, allowing the device 10 to operate as per the previous discussion where an object is determined to be a subject of focus of a user.

Figure 9:
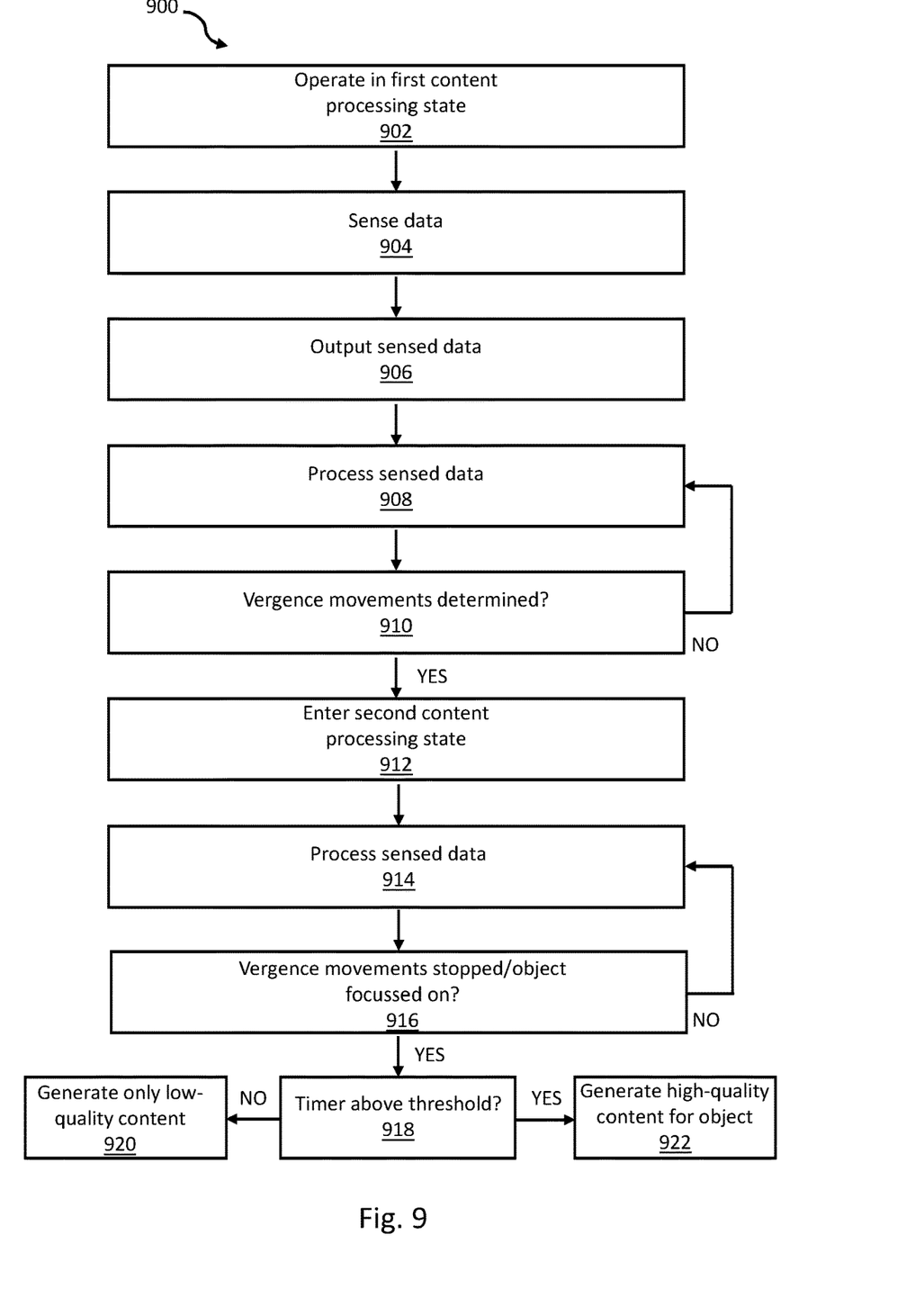
FIG. 9 is a schematic view illustrating a seventh method of operating a device according to an example.

An example method 900 of operating a device 10 to account for accommodation of the eyes of a user is shown in FIG. 9.

The method 900 comprises operating 902 the content processing component 16 in a first content processing state, sensing 904 data indicative of at least one eye positional characteristic of two eyes of a user of the device 10 using the sensor 12, and outputting 906 sensed data to the processor 14. Sensed data is processed 908 to determine 910 vergence movements, and where vergence movements are detected, the second content processing state is entered 912. Sensed data is processed 914 to determine 916 when vergence movements have stopped and the eyes of a user are at a fixed location/focusing on an object. A time is determined for how long the eyes of a user have been at the fixed location, and a comparison 918 of the determined time to a threshold is made. Where the time is determined to be below the threshold, the second content processing state only generates 920 relatively low-quality video content to be displayed on the display. Where the time is determined to be above the threshold, relatively high-quality video content is generated 922 to be displayed in a region in which the object determined to be a subject of focus is displayed using the first content processing state.

In some examples, the content processing component 16 operates in the second content processing state when the sensor data indicates that an eye of the user is looking at the display 18. Thus low-quality video content may be generated for display in at least a portion of the display 18 even where a user is looking at the display 18.

In some examples, the processor 14 may be configured to perform a calibration step for a user of the device 10. For example, the processor 14 may cause images to be displayed on the display 18 with various qualities of video content, and the processor 14 may request a response from the user, for example via the display 18 or another user input device, as to whether or not the images on the display are clear during different scenarios. This may allow the device 10 to be tuned to take into account eye positional characteristics of different users in different scenarios. For example, saccadic motion may have different durations for different users, and hence tuning of the threshold at which saccadic motion is determined may ensure that user experience is not impacted by the reduced processing of the second content processing state. The processor may be configured to modify the trigger based on user feedback, for example feedback in response to a calibration routine.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A device comprising:
   a content processing component operable in first and second content processing states;
   a display for displaying an image based on an output of the content processing component;
   at least one sensor operable to output sensor data indicative of at least one eye positional characteristic of a user of the device, the at least one eye positional characteristic being indicative of a region of the display determined to correspond to a foveal region of an eye of the user; and
   a processor configured to:
     process the sensor data;
     in the first content processing state of the content processing component:
       determine, on the basis of the processed sensor data, a region of the display corresponding to the foveal region;
       perform foveated processing of content to be displayed on the display, such that a first quality video content is generated and displayed in the determined region and a second quality video content is generated and displayed outside the determined region, the second quality video content lower than the first quality video content; and
       identify, on the basis of the processed sensor data, a trigger for entering the second content processing state of the content processing component, wherein the trigger comprises a determination of simultaneous movement of two eyes of a user in opposing directions; and
     in the second content processing state of the content processing component, over-ride the foveated processing used in the first content processing state such that a third quality video content is generated and displayed in at least a portion of the determined region, the third quality video content lower than the first quality video content, and such that a fourth quality video content is generated and displayed in a further portion of the determined region, the fourth quality video content higher than the third quality video content.

2. A device as claimed in claim 1, wherein in the second content processing state the second quality video content is generated for display on substantially the entirety of the display.

3. A device as claimed in claim 1, wherein in the second content processing state no content is generated for display on the display.

4. A device as claimed in claim 1, wherein the at least one eye positional characteristic comprises one or more of a rotational position of an eye, a direction of a foveal region of the user relative to the display, and a direction of a pupil of the user relative to the display.

5. A device as claimed in claim 1, wherein the content processing component operates in the second content processing state when the sensor data indicates that an eye of the user is looking at the display.

6. A device as claimed in claim 1, wherein the sensor data is processed to determine a speed of motion of an eye of the user, and the trigger comprises a determination that the speed of motion is above a pre-determined threshold.

7. A device as claimed in claim 1, wherein the sensor data is processed to determine a speed of motion of an eye of the user, and where the speed of motion is below a pre-determined threshold, the content processing component operates in the first content processing state.

8. A device as claimed in claim 1, wherein the sensor data is processed to determine saccadic motion of an eye of the user, and where saccadic motion is determined, the content processing component operates in the second content processing state.

9. A device as claimed in claim 1, wherein the sensor data is processed to determine vergence of two eyes of a user, and where vergence motion is determined, the content processing component operates in the second content processing state.

10. A device as claimed in claim 1, wherein the sensor data is processed to determine if an object displayed on the display is a subject of focus of the user, and the trigger comprises a determination that the object is not a subject of focus.

11. A device as claimed in claim 10, wherein in the second content processing state fifth quality video content is displayed in a region in which a further object determined to be a subject of focus is displayed, the fifth quality video content higher than the third quality video content.

12. A device as claimed in claim 11, wherein the device comprises a timer, processing the sensor data comprises determining a time indicative of how long an eye of the user has been at a fixed location, comparing the determined time to a pre-determined threshold, where the determined time is above a pre-determined threshold the fifth high-quality video content is generated for display in a region in which the object determined to be a subject of focus is displayed, and where the determined time is below the pre-determined threshold the second quality video content is generated for display on substantially the entirety of the display.

13. A device is claimed in claim 1, wherein a foveal region of an eye of the user is determined to be a region corresponding to 5 or less of a visual field of the user.

14. A device as claimed in claim 1, wherein the at least one sensor is one of an eye-tracking sensor, an electroencephalography sensor, an electromyography sensor, or an electrooculography sensor.

15. A device as claimed in claim 1, wherein the device comprises or is comprised in a headset.

16. A device as claimed in claim 15, wherein the headset comprises a virtual reality and/or an augmented reality headset.

* * * * *